United States Patent [19]

Marietta

[11] 4,022,022

[45] May 10, 1977

[54] HYDRAULIC SYSTEM AND CONTROL VALVE ASSEMBLY THEREFOR

[75] Inventor: Walter Edwin Marietta, Mentor, Ohio

[73] Assignee: Parker-Hannifin Corporation, Cleveland, Ohio

[22] Filed: Apr. 26, 1976

[21] Appl. No.: 680,534

[52] U.S. Cl. .................................. 60/433; 60/450; 60/465; 137/596.2; 180/6.48
[51] Int. Cl.² .................. F16H 39/46; F15B 11/16
[58] Field of Search ............ 60/420, 427, 433, 434, 60/445, 450, 462, 466; 180/6.48; 137/596.13, 596.2; 91/413

[56] References Cited

UNITED STATES PATENTS

| 2,238,061 | 4/1941 | Kendrick | 60/450 X |
| 3,181,389 | 5/1965 | Richard | 180/648 UX |
| 3,722,543 | 3/1973 | Tennis | 137/596.12 |
| 3,744,517 | 7/1973 | Budzich | 137/596.2 |
| 3,882,896 | 5/1975 | Budzich | 137/596.1 |

Primary Examiner—Edgar W. Geoghegan
Attorney, Agent, or Firm—Donnelly, Maky, Renner & Otto

[57] ABSTRACT

A hydraulic system and control valve assembly therefor characterized in that it provides a two wheel pressure compensated hydraulic drive for mobile equipment in forward or rearward direction at any speed up to maximum as determined by the operation of the control valve assembly. Said control valve assembly is further characterized in that it incorporates an override for the pressure compensating means to achieve steering control by decreasing the rate of flow of fluid to either wheel motor or to achieve braking action in conjunction with a counterbalance valve in the motor return circuit by decreasing the rate of flow of fluid to both wheel motors.

15 Claims, 3 Drawing Figures

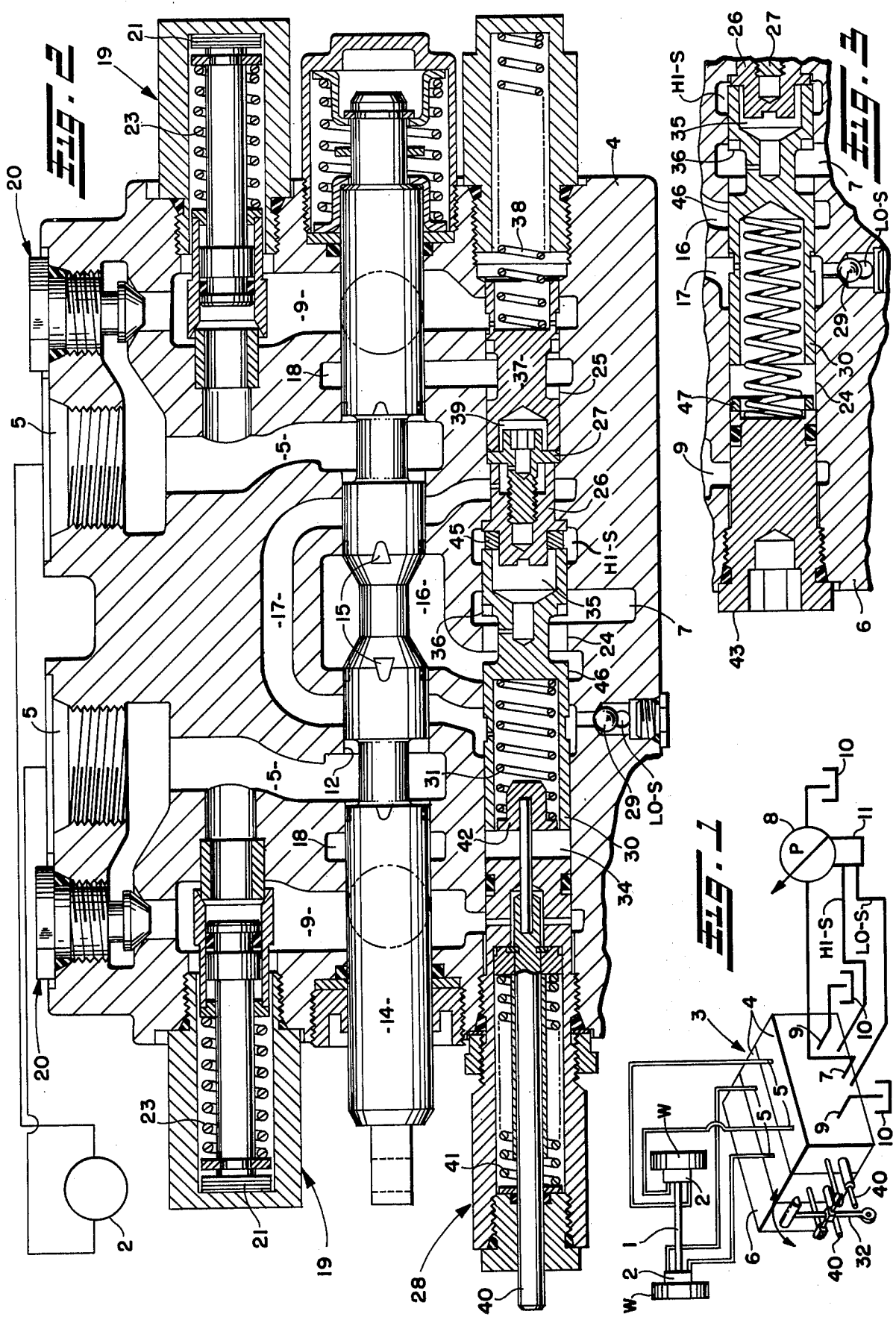

HYDRAULIC SYSTEM AND CONTROL VALVE ASSEMBLY THEREFOR

BACKGROUND OF THE INVENTION

In a mowing machine and like mobile equipment, considerable expense is entailed in providing a steering mechanism, a power transmission system and differential for transmitting engine power to the driving wheels for forward and rearward movement of the machine at preselected speed up to a predetermined maximum speed, a brake system, and a hydraulic system for controlling any implements on the machine.

SUMMARY OF THE INVENTION

The present invention provides a hydraulic transmission and control valve assembly therefor which is of simple and inexpensive structure to provide a pressure compensated load sensing system incorporating hydraulic driving of the machine in forward or rearward direction at any desired speed up to maximum by operation of the control valve assembly, an override control for the pressure compensator means operative to decrease the speed of either wheel with respect to the other to effect steering of the machine and further operative to decrease the speed of both wheels to achieve braking action in conjunction with a counterbalance valve which restricts return flow of fluid from the wheel motors. In addition to the braking action aforesaid, the present invention provides for fast stopping of the forward or rearward movement of the machine by operation of the control valve assembly to block supply and return of fluid to and from the wheel drive motors.

It is a principal object of this invention to provide a hydraulic system of the character referred to in which the speed and direction of rotation of a pair of rotary wheel drive motors is under the control of a pair of simultaneously operated directional control valve members which define variable area metering orifices of size dependent upon the extent of movement of said valve members in forward or rearward propelling direction.

It is another object of this invention to provide a pressure compensator in association with each directional control valve member to maintain the preselected speed in either forward or rearward direction despite differences in the load pressures of the wheel drive motors.

It is another object of this invention to provide overrides for the pressure compensators which, when simultaneously operated, decrease the rate of flow of oil to the wheel drive motors and consequent operation of counterbalance valves to restrict return flow from the wheel drive motors to apply braking action on the machine.

It is another object of this invention to provide pressure compensator overrides which are individually operable to decrease the speed of either wheel drive motor with respect to the other thus to effect steering of the machine.

Other objects and advantages will appear from the ensuing description.

BRIEF DESCRIPTION OF THE DRAWING

FIG. 1 is a diagrammatic view of the present hydraulic system in association with a pair of wheels driven by rotary hydraulic motors;

FIG. 2 is a central vertical cross-section view of a preferred form of control valve assembly which is operably connected between a pump and a pair of wheel drive motors; and FIG. 3 is a fragmentary cross-section view of a modified form of control valve assembly for controlling operation of a hydraulic implement on the mobile equipment.

DETAILED DESCRIPTION OF A PREFERRED EMBODIMENT

The present invention incorporates some of the principles of the integrated pressure compensated load system as disclosed in the U.S. Pat. No. 3,866,419 to John C. Paul but embodies a number of changes and improvements to adapt the control valve assembly for braking, steering, and speed and directional control of a mowing machine and the like.

In FIG. 1, the wheels W of a mowing machine and the like are rotatably supported on an axle 1 and are driven by hydraulic motors 2. In the present case, steering of the machine is effected by driving one or the other of the wheels W at a decreased speed and hence, casters, not shown, will be provided forwardly and/or rearwardly of the wheels W to support the frame of the machine.

The control valve assembly 3 for the hydraulic motors 2 includes a pair of valve housings 4 having motor ports 5 connected to the ports of the respective motors 2.

The valve housings 4 are secured together along with one or more other utility valve housings 6 to provide a common inlet passage 7 connected to the discharge port of a variable capacity pump 8 and common return passages 9 communicated with a tank 10. The pump 8 and its control system 11 may, for example, be of the type disclosed in the Malott U.S. Pat. No. 3,726,093, Malott U.S. Pat. No. 3,941,513, or Paul U.S. Pat. No. 3,866,419 in which the pump control increases or decreases the capacity of the pump 8 to maintain a predetermined pressure drop across a variable area orifice. As shown in FIG. 2 each housing 4 has a directional control valve bore 12 in which a four-way closed center valve spool 14 is reciprocable to control the direction and speed of the associated wheel motor 2 according to the direction and extent of movement of said spool 14 which varies the size of the variable area orifice 15. Said bore 12 is intersected, starting at the middle, by a supply passage 16, by the ends of a crossover feed passage 17, by the motor passages 5, by the ends of an outlet passage 18, and by the return passages 9.

Each housing 4 also has therein overload relief valves 19 and makeup check valves 20 communicating the respective motor passages 5 with the return passages 9 to prevent excessive pressure buildup and cavitation between the motors 2 and valve assembly 3 due for example to inertia loads as when the spools 14 are shifted from one operating position to closed neutral position. The relief pressures of the overload relief valves 19 may be adjusted by varying the number of shims 21 to vary the degree of compression of the relief valve springs 23.

Each housing 4 has coaxial pressure compensator spool and counterbalance valve bores 24 and 25, adjacent ends of which are closed by the plug and screw assembly 26–27. Intersecting the compensator spool bore 24 is the HI-S signal passage, the inlet passage 7, the supply passage 16, one end of the crossover feed passage 17, and a return passage 9. Closing the outer end of the compensator bore 24 is a plug assembly 28. The aforesaid end of the crossover feed passage 17 communicates with the LO-S signal passage via a check valve 29.

Slidable in the bore is a pressure compensator spool 30 which is biased by the spring 31 to the position shown when the pressure drop across the variable area orifice 15 of the spool valve 14 is of predetermined value whereby the motors 2 will be actuated at the same selected speed depending upon the extent of movement of both spools 14 as by the control lever 32 shown in FIG. 1 to propel the mobile equipment in either forward or rearward direction at desired speed. In the event of a difference in load pressure of the motors 2, the LO-S pressure of the motor 2 and housing 4 having the higher load pressure will be blocked by the check valve 29 in the other housing 4 from the chamber 34 of its compensator spool 30 and hence the higher HI-S pressure will tend to increase the flow through the variable area orifice 15 of the spool 14 having the lower load pressure fluid motor 2. However, such higher HI-S pressure will act in the chamber 35 to move the compensator spool 30 to the left compressing the spring 31 and thereby pinching down the flow of the higher pressure fluid across variable area orifice 36 from the inlet passage 7 to the supply passage 16 to cause a pressure drop to maintain a desired pressure drop across the variable area orifice 15 of the spool valve 14 associated with the motor 2 of lower load pressure.

The counterbalance valve bore 25 has therein a counterbalance valve member 37 which is biased by the spring 38 to the position shown closing communication between the outlet passage 18 and the adjacent tank passage 9 except when the pressure in the crossover feed passage 17 acting in the chamber 39 is of magnitude sufficient to move the counterbalance valve member 37 to the right to open communication between the outlet passage 18 and the tank passage 9. Accordingly, when the spools 14 are shifted to an operating position there can be no return flow through the motor passages 5 which are then in communication with outlet passages 18 until the pressure in the crossover feed passage 17 is sufficient to actuate the counterbalance valve members 37.

To provide for steering control, each compensator 30 has an override member 40 which, when pulled to the left, decreases the flow to its motor 2 to cause turning to the right as viewed in FIG. 1 when the speed of the right motor 2 is decreased and to the left when the left motor 2 speed is decreased. The override 40 is biased to the position shown by a spring 41 which retains the follower 42 for spring 31 in the position shown in FIG. 2 during the normal operation of the compensator spool 30. However, when it is desired to decrease the speed of one motor 2 with reference to the speed of the other motor 2, the override member 40 is pulled a desired amount to the left to pull the spring follower 42 to the left thus to decrease the compression on the spring 31 so that a lower pressure differential between HI-S and LO-S will cause the compensator spool 30 to move to pinch down the flow from the inlet passage 7 to the supply passage 16 thereby decreasing the pressure differential upstream and downstream of the variable area orifice 15. When both overrides 40 are simultaneously pulled to the left, the resulting movement of both compensator spools 30 affords a braking action on the equipment. The reduction of pressure in the crossover feed passages 17 also effects partial or full closing of the counterbalance valve members 37 whereby return flow from the motors 2 is restricted or blocked for effective braking action. Of course, for rapid stopping, the spool valves 14 may be shifted to off position blocking flow of fluid under pressure to both motors 2 and blocking return flow from the motors 2. As previously mentioned, the inertia of the equipment may result in a high fluid pressure in the blocked return passage and to prevent such pressure from exceeding a desired maximum value the relief valves 19 will open and cavitation is prevented by opening of the makeup check valves 20 on the expanding side of the motors 2.

With reference to FIG. 3, the other control valve housing 6 for controlling the operation of a utility hydraulic cylinder (not shown) need not be provided with the compensator override 40 and hence the outer end of the compensator spool bore 24 is closed by an ordinary plug member 43 and the spacer ring 45 in FIG. 2 is removed so that the land 46 of the compensator spool 30 in FIG. 3 will function as a load check valve to prevent load dropping. A spacer ring 47 may be provided to limit the minimum size of the variable area orifice 36 between inlet passage 7 and supply passage 16. It is to be understood that instead of the spool 14, the FIG. 3 valve assembly may have associated therewith a four-way float spool which would provide, in addition to the usual operating positions, a float position which establishes restricted intercommunication of the motor passages 5 with each other.

In a three-way control valve assembly, the compensator spool 30 may be of the same construction as shown in FIG. 3 but, in such case, the counterbalance valve 37 may be omitted whereby the compensator spool bore 24 may be a blind bore. Such three-way control valve assembly would generally be provided with a pressure sensitive flow control exposed to pressure upstream and downstream of a variable area meter-out orifice in the return passage to restrict flow to the outlet tank passage when the pressure drop across the variable area meter-out orifice exceeds a desired value.

The embodiments of the invention in which an exclusive property or privilege is claimed are defined as follows:

1. A hydraulic system comprising variable volume pump means, a directional control valve, and a fluid motor operatively interconnected whereby fluid delivered by said pump means is conducted to said fluid motor via said directional control valve; said directional control valve having variable area orifice means to determine the speed of actuation of said fluid motor; said pump means having output adjustment mean responding to the pressure drop across said orifice means to adjust the output of said pump means according to the flow demand set by said orifice means; a pressure compensating member upstream of said orifice means having opposite ends exposed respectively to the pressures upstream and downstream of said orifice means; spring means biasing said compensating member in the same direction as the downstream pressure acting on one end; said compensating member, upon increase of upstream pressure with respect to downstream pressure, being moved thereby in the opposite direction against said spring means to provide an additional restriction in the supply path of fluid to said directional control valve upstream of said orifice means thus to maintain the flow demand set by said orifice means.

2. The system of claim 1 wherein means are provided for decreasing the load of said spring means on said compensating member to decrease the flow through said orifice means to less than the flow demand set thereby.

3. The system of claim 1 wherein a counterbalance valve is actuated by predetermined downstream pressure to open a fluid return path from said fluid motor through said directional control valve.

4. The system of claim 3 wherein said compensating member and said counterbalance valve are movable in coaxial bores in a housing for said directional control valve with plug means closing the adjacent ends of said bores.

5. The system of claim 1 wherein said compensating member constitutes a load check valve to prevent load dropping in the event that a load on said fluid motor imposes a pressure between said motor and said directional control valve exceeding the pressure delivered by said pump means.

6. The system of claim 2 wherein a duplicate fluid motor, a duplicate directional control valve, a duplicate pressure compensating member, and a duplicate means for decreasing the load of duplicate spring means on said duplicate compensating member are provided for actuation of said duplicate fluid motor by said pump means; and wherein means are provided for simultaneously operating said directional control valves to equal flow demands, the operation of either or both of said means for decreasing spring load being operative to decrease the flow of either or both fluid motors with respect to the demanded flow set by said orifice means.

7. The system of claim 6 wherein each directional control valve has a counterbalance valve moved by predetermined downstream pressure to open a return flow path from the associated fluid motor whereby operation of either or both of said means for decreasing spring load affords a braking action on either or both of said fluid motors as a consequence of the reduction in downstream pressure sufficient to permit movement of the associated counterbalance valve to restrict said return fluid path.

8. A hydraulic system comprising a variable volume pump means, first and second directional control valves, and first and second fluid motors operatively interconnected whereby fluid delivered by said pump means is conducted to said fluid motors via the respective directional control valves; each directional control valve having variable area orifice means to determine the speed of actuation of the fluid motor connected thereto; said pump means having output adjustment means responding to the pressure drop across said orifice means to adjust the output of said pump according to the flow demands set by said orifice means; a pressure compensating member upstream of each orifice means having opposite ends exposed respectively to the pressures upstream and downstream of said orifice means; spring means biasing each compensating member in the same direction as the downstream pressure acting on one end; means for simultaneously operating said directional control valves to set said orifice means to equal flow demands; either compensating member, upon increase of upstream pressure with respect to the pressure downstream of its associated orifice means, being moved thereby in the opposite direction to provide an additional restriction in the supply path of fluid to the associated directional control valve upstream of its orifice means thus to maintain the equal flow demands set by said orifice means.

9. The system of claim 8 wherein each directional control valve has means for decreasing the spring load on the associated compensating member to decrease the flow through the associated orifice means to less than the flow demand set thereby.

10. The system of claim 8 wherein each directional control valve has a counterbalance valve moved by predetermined downstream pressure to open a return flow path from the associated fluid motor whereby operation of either or both of said means for decreasing spring load affords a braking action on either or both of said fluid motors as a consequence of the reduction in downstream pressure sufficient to permit movement of the associated counterbalance valve to close or partly close said return flow path.

11. A directional control valve comprising a housing having a bore intersected axially therealong by supply, feed, motor, outlet, and return passages; a valve spool movable in said bore from a position blocking fluid communication between said supply and feed passages, between said feed and motor passages, between said motor and outlet passages, and between said outlet and return passages to an operating position establishing a variable area orifice between said supply and feed passages of size according to the extent of movement of said spool, and establishing fluid communication between said feed passage and one of two motor passages, and between the other motor passage and said outlet passage; said housing having coaxial pressure compensation and counterbalance valve bores with plug means therebetween; said compensator bore being intersected by a pressure inlet passage, by said supply passage, and by said feed passage; a pressure compensating member in said compensator bore having opposite ends exposed respectively to pressure in said supply passage upstream of said orifice means and in said feed passage downstream of said orifice means; said compensating member being moved against spring biasing means responsive to increased pressure drop across said orifice means to restrict flow from said inlet passage to said supply passage to maintain the flow demand set by said orifice means; said counterbalance valve bore being intersected by said feed passage, by said outlet passage, and by said return passage; a counterbalance valve member in said counterbalance valve bore having an area exposed to pressure in said feed passage and being movable against spring biasing means by predetermined feed passage pressure to open fluid communication between said outlet and return passages for flow of fluid therethrough from said other motor passage.

12. The directional control valve of claim 11 wherein said plug means is disposed in a bore interconnecting said co-axial bores and comprises screw connected members engaging shoulders in the respective coaxial bores.

13. The directional control valve of claim 11 wherein said compensating member constitutes a load check valve between said supply and inlet passages.

14. The directional control valve of claim 11 wherein said housing has means for decreasing the load of said spring biasing means on said compensating member to decrease the flow through said orifice means to less than the flow demand set thereby.

15. The directional control valve of claim 11 wherein said valve spool has another operating position for conducting fluid to said other motor passage via said inlet, supply and feed passages and for conducting fluid from said one motor passage to said return passage via said outlet passage when said counterbalance valve member is moved by predetermined fluid pressure in said feed passage.

* * * * *